(No Model.)
F. L. BREWER.
ATTACHMENT FOR CHECK ROWERS.
No. 277,673. Patented May 15, 1883.
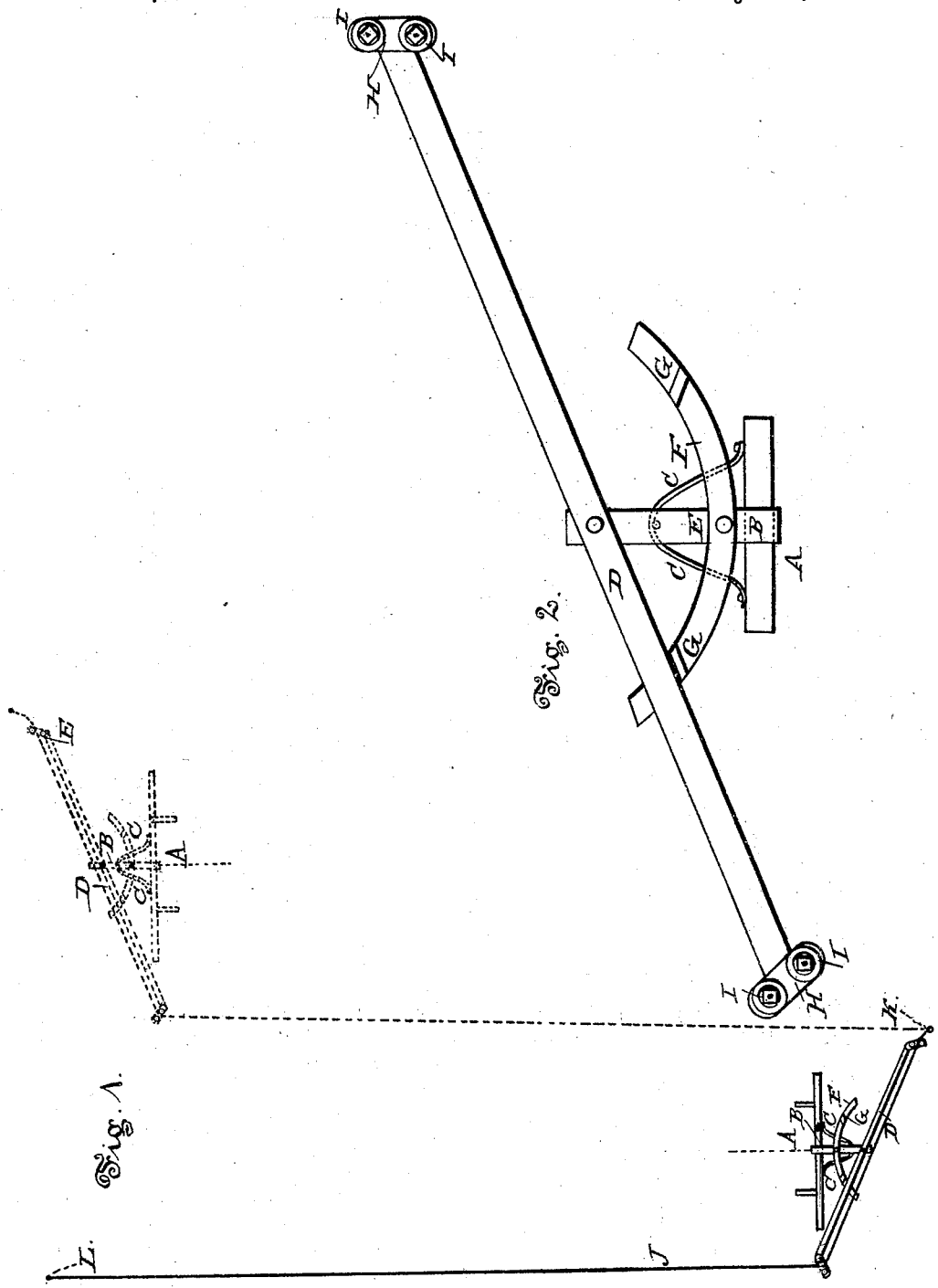
WITNESSES:
Fred. G. Dieterich
Wm. Leslie
INVENTOR.
Frank L. Brewer
By Louis Bagger & Co.
ATTORNEYS.

UNITED STATES PATENT OFFICE.

FRANK L. BREWER, OF BEDFORD, IOWA.

ATTACHMENT FOR CHECK-ROWERS.

SPECIFICATION forming part of Letters Patent No. 277,673, dated May 15, 1883.

Application filed February 9, 1883. (No model.)

*To all whom it may concern:*

Be it known that I, FRANK L. BREWER, of Bedford, in the county of Taylor and State of Iowa, have invented certain new and useful Improvements in Attachments for Check-Rowers; and I do hereby declare that the following is a full, clear, and exact description of the invention, which will enable others skilled in the art to which it appertains to make and use the same, reference being had to the accompanying drawings, which form a part of this specification, and in which—

Figure 1 is a plan view, showing the positions of the check rope or wire and of my device when in operation, and Fig. 2 is a top view of the device.

Similar letters of reference indicate corresponding parts in both the figures.

My invention has relation to attachments for check-rowers; and it consists in the improved construction and combination of parts of a device adapted to be fastened upon a check-rower, and serving to support the check rope or wire and to shift it from one side of the machine to the other, as hereinafter more fully described and claimed.

In the accompanying drawings, the letter A indicates the rear part of a check-row cornplanter, upon the center of which is fastened a rearward-projecting bracket, B, braced by two rods, C. Upon the outer end of this bracket is hinged or pivoted a bar or lever, D, at its center, the ends of which project a short distance outside the frame of the planter. The upper side of bracket B is recessed at E for the reception of a segmental flat bar, F, the ends of which extend rearward to both sides under the lever D, and are provided upon their upper surfaces, near the ends, with projections or bumpers G, which serve to stop lever D, when swung from one side to the other, from striking the planter-frame. Upon the ends of lever D are fastened two oblique cross-pieces, H, pointing with their rear ends outward, and two pairs of guide-pulleys, I, are journaled upon the ends of said cross-pieces, one at each end of them. The check-rope J passes over and between the guide-pulleys I, and is fastened at each end of the field by stakes K and L, the stake at the starting end of the field being one row ahead of the stake at the other end, so that the rope, as it is paid out at the rearward-pointing end of the swinging lever D, will be laid down in the row in which the machine will return.

By reference to Fig. 1 of the drawings the operation will readily be seen, the check-rope, part of the planter, and the swinging bar being shown in full lines upon its way up the field and in dotted lines returning. In the above-mentioned figure the check-rope will be seen fastened to stake K, carried over the pulleys and checking device and over the field to stake L, which is one row behind stake K. When the planter, after passing across the field, arrives at the upper end, the rope is thrown out of engagement with the checking mechanism. Stake L is pulled up and driven down two rows ahead. While the planter is turning, the rope is again placed in engagement with the checking mechanism, and the planter proceeds to the other end of the field, where the same process is performed, and stake K moved, &c., in the same manner until the planting is finished. It will be seen that the lever swings upon its pivot when the planter is turned, bringing the end forward which was to the rear, and vice versa, allowing the rope to enter at the forward turned end and to pass out at the other end.

By using this device, which may be attached to any construction of check-rower, a great amount of time and labor in handling the rope or wire will be saved, all the handling necessary being the moving of the stakes.

Having thus described my invention, I claim and desire to secure by Letters Patent of the United States—

1. In an attachment for check-rowers, the combination of the swinging lever pivoted upon a bracket extending rearward from the planter-frame, and having guide-pulleys at its ends, with the rope or wire fastened at both ends of the field, one end one row ahead of the other, as and for the purpose shown and set forth.

2. The attachment for check-rowers, consisting of the swinging lever D, having oblique cross-pieces H, provided with guide-pulleys I, bracket B, fastened upon the rear end of the planter-frame, and the segmental flat bar F, having bumpers G, substantially as and for the purpose shown and set forth.

In testimony that I claim the foregoing as my own I have hereunto affixed my signature in presence of two witnesses.

FRANK LINDEN BREWER.

Witnesses:
ALEX. JOHN,
SURENA LUCAS.